US005245828A

United States Patent [19]

Nakamura

[11] Patent Number: 5,245,828

[45] Date of Patent: Sep. 21, 1993

[54] HYDRAULIC DRIVE SYSTEM FOR CIVIL ENGINEERING AND CONSTRUCTION MACHINE

[75] Inventor: Kazunori Nakamura, Niihari, Japan

[73] Assignee: Hitachi Construction Machinery Co., Ltd., Tokyo, Japan

[21] Appl. No.: 635,586

[22] PCT Filed: Aug. 21, 1990

[86] PCT No.: PCT/JP90/01062

§ 371 Date: Jan. 7, 1991

§ 102(e) Date: Jan. 7, 1991

[87] PCT Pub. No.: WO91/02905

PCT Pub. Date: Mar. 7, 1991

[30] Foreign Application Priority Data

Aug. 21, 1989 [JP] Japan ................................ 1-213078

[51] Int. Cl.[5] ............................................ F16D 31/02

[52] U.S. Cl. ....................................... 60/452; 60/445; 91/459; 91/518

[58] Field of Search ................ 60/420, 423, 426, 434, 60/445, 451, 452; 91/511, 518

[56] References Cited

U.S. PATENT DOCUMENTS 3,863,448 2/1975 Purdy .................................. 60/422
4,212,164 7/1980 Young .................................. 60/452
4,308,453 10/1983 Westveer .............................. 60/445
4,479,349 10/1984 Westveer .............................. 60/420
4,617,854 10/1986 Kropp .................................. 91/517
4,722,186 2/1988 Louis et al. ........................... 60/452
4,845,950 7/1989 Metzner ................................ 60/451
5,005,358 4/1991 Hirata et al. .......................... 60/426

FOREIGN PATENT DOCUMENTS 394465 10/1990 European Pat. Off. .
187101 10/1984 Japan .
60-11706 1/1985 Japan .
9002268 8/1990 PCT Int'l Appl. .

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A delivery rate of a main hydraulic pump is controlled so that a load sensing differential pressure is held at a preset target value. In order to maintain the delivery rate of the pump substantially constant even in the case of external loads, inertial loads, and compressibility or leakage problems with the hydraulic fluid, there is provided a dead zone for permitting a deviation between the load sensing differential pressure and the preset target value.

4 Claims, 7 Drawing Sheets

HYDRAULIC DRIVE SYSTEM FOR CIVIL ENGINEERING AND CONSTRUCTION MACHINE

DESCRIPTION

1. Technical Field

The present invention relates to a hydraulic drive system for civil engineering and construction machines, and more particularly to a hydraulic drive system mounted on civil engineering and construction machines such as hydraulic excavators and constituting the so-called load sensing system in which a delivery flow rate of a main hydraulic pump is controlled so that a differential pressure between a delivery pressure of the main hydraulic pump and a maximum load pressure among actuators is held constant.

2. Background Art

Civil engineering and construction machines, for example, hydraulic excavators, each mount thereon a hydraulic drive system for driving a plurality of working members such as a boom, an arm and a swing. The hydraulic drive system generally comprises a prime mover, a main hydraulic pump driven by the prime mover, a plurality of actuators such as hydraulic cylinders and motors for driving the above working members, and a plurality of flow control valves for controlling flows of a hydraulic fluid supplied from the main hydraulic pump to the respective actuators.

Recently, it has been proposed and practiced to adopt the so-called load sensing system in that type of the hydraulic control system. The load sensing system is to receive a differential pressure between a delivery pressure of the main hydraulic pump and a maximum load pressure among the plurality of actuators, as a load sensing differential pressure, and control a delivery rate of the main hydraulic pump so that the load sensing differential pressure is held at a preset target differential pressure. For instance, JP, A, 60-11706 discloses a hydraulic drive system equipped with a pump regulator which comprises a control actuator for driving a swash plate of the main hydraulic pump, i.e., pump displacement volume varying means, and a regulating valve operated in response to the load sensing differential pressure for controlling operation of the control actuator. The regulating valve of the pump regulator includes a spring for setting a target value of the load sensing differential pressure.

In such a hydraulic drive system arranged to implement the load sensing system, the delivery rate of the main hydraulic pump is controlled so that the differential pressure between the pump delivery pressure and the maximum load pressure, i.e., the load sensing differential pressure, is held at a constant value in balance with a force of the spring of the regulating valve. When a single actuator is solely driven, for example, the flow rate of the hydraulic fluid passing through the associated flow control valve is substantially in proportion to the opening area of the flow control valve, and the delivery rate of the main hydraulic pump becomes equal to the flow rate of the hydraulic fluid passing through the flow control valve. Thus, the delivery rate of the main hydraulic pump is in substantially proportional relation to the opening area of the flow control valve. This is also true in the case of simultaneously driving plural actuators.

However, the above conventional hydraulic drive system equipped with the pump regulator has accompanied the problem as follows.

In civil engineering and construction machines, for example, hydraulic excavators, which mount thereon hydraulic drive systems, when jolting or vibrations of large amplitude occur upon application of some external load such as an impact, an operating lever may be shifted to vary the opening area of an associated flow control valve and the load sensing differential pressure may be fluctuated correspondingly, in spite of that the operating lever is continuously grasped fast by an operator to hold the opening area of the flow control valve constant with an intention of keeping an operating speed of an actuator. Further, even when a hydraulic fluid is supplied to the actuator with the opening area of the flow control valve held constant, a load pressure may be fluctuated owing to compressibility of the hydraulic fluid and so is the load sensing differential pressure, in the case where the inertial load of a working member driven by the actuator is large.

In the above conventional hydraulic drive system, however, the regulating valve of the pump regulator is operated directly following changes in the load sensing differential pressure, thereby varying the pump delivery rate dependently. Therefore, when the load sensing differential pressure is fluctuated on account of the aforesaid external load, inertial load, fluid or oil compressibility and the like, the regulating valve is caused to operate following fluctuations in the load sensing differential pressure. Accordingly, the pump delivery rate is also deviated from an intended value, with the result that an operating speed of the actuator is undesirably changed during the operation and operability is lowered.

In view of the foregoing situations in the prior art, an object of the present invention is to provide a hydraulic drive system for a civil engineering and construction machine which can suppress changes in the pump delivery rate upon fluctuations in the load sensing differential pressure on account of external load, inertial load, fluid or oil compressibility and the like.

DISCLOSURE OF THE INVENTION

To achieve the above object, the present invention provides a hydraulic drive system for a civil engineering and construction machine comprising a main hydraulic pump of variable displacement type, a plurality of actuators driven by a hydraulic fluid delivered from said main hydraulic pump, a plurality of flow control valves for controlling flows of the hydraulic fluid supplied to said actuators, and pump control means for receiving a differential pressure between a delivery pressure of said main hydraulic pump and a maximum load pressure among said plurality of actuators, as a load sensing differential pressure, and controlling a delivery rate of said main hydraulic pump so that said load sensing differential pressure is held at a preset target differential pressure, wherein said hydraulic drive system further comprises flow rate holding means having a dead zone for a deviation between said load sensing differential pressure and said target differential pressure for reserving a control to be effected by said pump control means when said deviation is within said dead zone, thereby to hold the delivery rate of said main hydraulic pump substantially constant.

By providing the above flow rate holding means and setting the dead zone to the proper size in consideration of changes in the load sensing differential pressure due to predictable factors such as external load, inertial load, fluid or oil compressibility and the like, the present hydraulic drive system can suppress changes in the pump delivery rate upon fluctuations in the load sensing differential pressure due to the external load and the like and, therefore, can satisfactorily prevent an operating speed of the actuator from varying due to the external load and the like contrary to an operator's intention during operation of the actuator.

Preferably, the pump control means includes a control actuator for driving displacement volume varying means of the main hydraulic pump, and valve means operated in response to the load sensing differential pressure for controlling operation of the control actuator; the flow rate holding means is incorporated in the valve means, and the dead zone is provided by a particular stroke region of the valve means for holding the control actuator in a rest state.

The pump control means may be arranged to include a control actuator for driving displacement volume varying means of the main hydraulic pump, valve means for controlling operation of the control actuator, a differential pressure sensor for detecting the load sensing differential pressure, and a controller for calculating a differential pressure deviation between the load sensing differential pressure detected by the differential pressure sensor and the target differential pressure, and driving the valve means so that the differential pressure deviation is reduced. In this case, the flow rate holding means is incorporated in the controller and includes means for storing a limit value to define the dead zone and means for determining whether or not the differential pressure deviation is within the dead zone defined by the limit value, and outputting to the valve means a signal to hold the control actuator in a rest state when the differential pressure deviation is within the dead zone.

Furthermore, the dead zone may be set variable to decrease as the delivery rate of the main hydraulic pump is increased.

BEST MODE FOR CARRYING OUT THE INVENTION

Hereinafter, preferred embodiments of the present invention will be described with reference to the drawings.

Fist Embodiment

To begin with, a first embodiment of the present invention will be explained by referring to FIG. 1.

Figure 1:
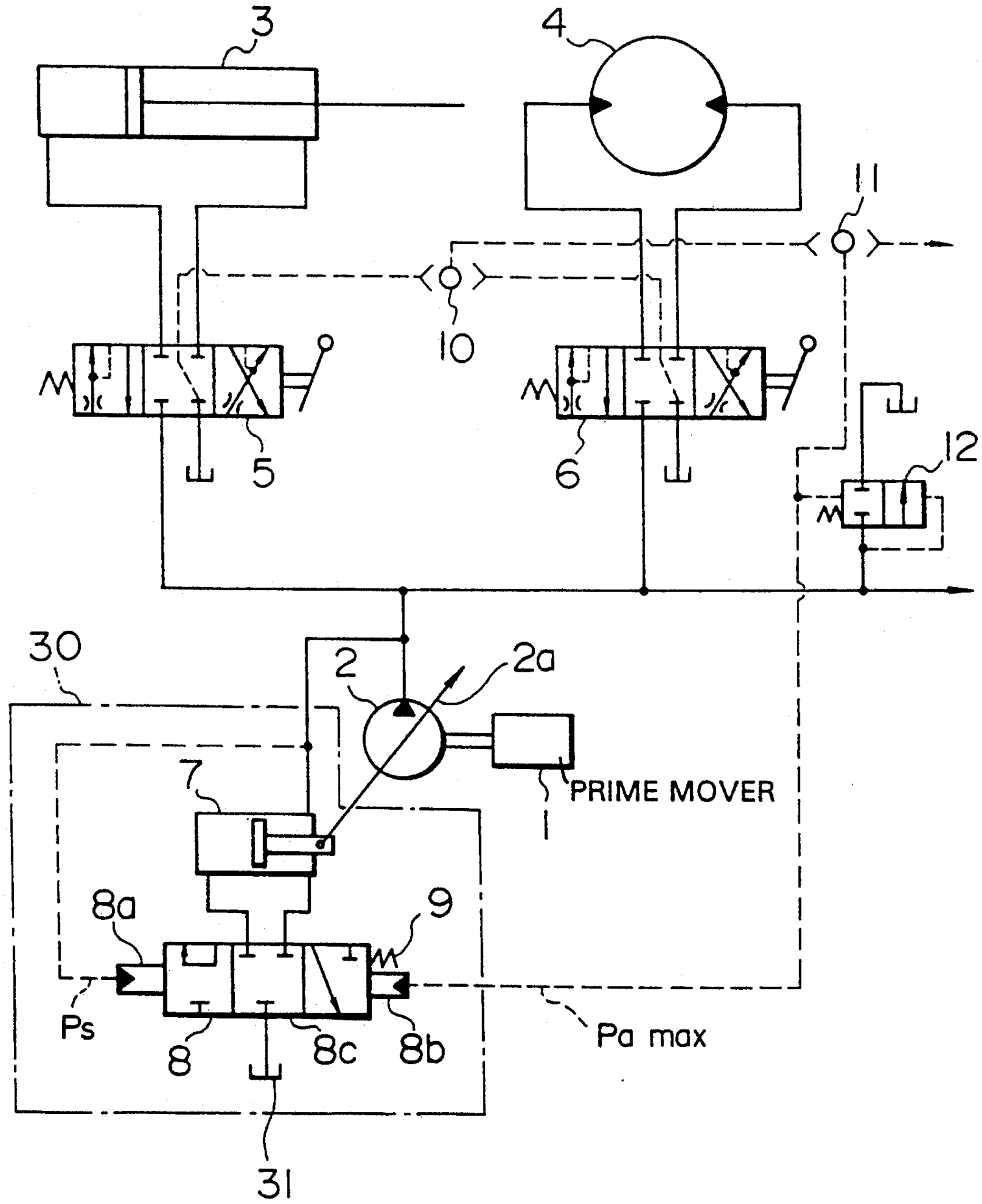
FIG. 1 is a diagrammatic view of a hydraulic drive system according to a first embodiment of the present invention.

In FIG. 1, a hydraulic drive system of this embodiment comprises a prime mover 1, a main hydraulic pump 2 of variable displacement type driven by the prime mover 1, a plurality of actuators including a hydraulic cylinder 3 and a hydraulic motor 4 both driven by a hydraulic fluid delivered from the main pump 2, flow control valves 5, 6 for controlling flows of the hydraulic fluid supplied from the main pump 2 to the hydraulic cylinder 3 and the hydraulic motor 4, a shuttle valve 10 for selecting higher one between a load pressure of the hydraulic cylinder 3 and a load pressure of the hydraulic motor 4, a shuttle valve 11 for selecting higher one between the load pressure selected by the shuttle valve 10 and a load pressure of another actuator (not shown), i.e., a maximum load pressure Pamax, a pump control device or regulator 30 for receiving a differential pressure between a pump pressure Ps and the maximum load pressure Pamax, as a load sensing differential pressure ΔPLS, to control a delivery rate of the main pump 2 so that the load sensing differential pressure ΔPLS becomes a preset target differential pressure, and an unloading valve 12 for receiving the differential pressure between the pump pressure Ps and the maximum load pressure Pamax, as a load sensing differential pressure ΔPLS, to limit a transient rising of the load sensing differential pressure ΔPLS and hold the pump pressure Ps at a specified value when the flow control valves 5, 6 are both in a neutral state.

The pump regulator 30 comprises a control actuator 7 for driving a displacement volume varying mechanism of the main pump 2, i.e., a swash plate 2*a*, to control the displacement volume, and a regulating valve 8 for regulating inflow and outflow of the hydraulic fluid into and from the head side and the rod side of the control actuator 7 to regulate operation of the control actuator 7. The regulating valve 8 has a pair of drive parts 8*a*, 8*b* in opposite relation to which the pump pressure Ps and the maximum load pressure Pamax are introduced, respectively. The regulating valve 8 is thereby operated in response to the load sensing differential pressure ΔPLS. Further, the regulating valve 8 includes a spring 9 disposed on the same side as the drive part 8*b*. A stroke position of the regulating valve 8 is determined from balance between the load sensing differential pressure ΔPLS and an urging force of the spring 9, whereby the delivery rate of the main pump 2 is controlled. In other words, a target value of the load sensing differential pressure ΔPLS is set dependent on the urging force of the spring 9.

The regulating valve 8 has also a particular stroke region 8*c* in its neutral position for cutting off both the communication of the head side with the rod side of the control actuator 7 and the communication of the head and rod sides of the control actuator 7 with a reservoir (tank) 31. The particular stroke region 8*c* is to provide a dead zone for changes in the load sensing differential pressure ΔPLS due to usually possible factors such as external load, inertial load and fluid or oil compressibility. A stroke of the region 8*c* is set so that the aforesaid communications are cut off when the regulating valve 8 is shifted upon dependent on such changes in the load sensing differential pressure ΔPLS, thereby to hold the delivery rate of the main pump 2 substantially constant. In short, the regulating valve 8 includes flow rate holding means for reserving a control to be effected by the pump regulator 30 when a differential pressure deviation ΔΔP between the load sensing differential pressure ΔPLS and the target differential pressure set by the spring 9 is within the dead zone given by the stroke region 8*c*, thereby holding the delivery rate of the main pump 2 substantially constant.

In the first embodiment thus arranged, when the differential pressure between the pump pressure Ps and the maximum load pressure Pamax, i.e., the load sensing differential pressure ΔPLS, is increased with an increase in the pump pressure Ps, for example, to such an extent that the differential pressure deviation ΔΔP between the load sensing differential pressure ΔPLS and the target differential pressure set by the spring 9 exceeds above the dead zone of the regulating valve 8, the regulating valve 8 is shifted from a neutral position shown in FIG. 1 to a lefthand position on the drawing, whereupon the rod and head sides of the control actuator 7 are communicated with each other to move its piston rightwardly from the position shown in FIG. 1 due to a difference in the pressure receiving area of the piston between the rod and head sides. The displacement volume of the main pump 2 is thereby decreased to reduce the delivery rate of the main pump 2, so that the reduced flow rate is supplied to the actuators such as the hydraulic cylinder 3 and the hydraulic motor 4. Simultaneously, the pump pressure Ps is also lowered to reduce the load sensing differential pressure ΔPLS, resulting in that the differential pressure deviation ΔΔP approaches 0. When the differential pressure deviation ΔΔP approaches 0, the regulating valve 8 is shifted leftwardly on the drawing from the state establishing the aforesaid left-hand position. Therefore, the regulating valve 8 is finally controlled into a neutral condition where the load sensing differential pressure ΔPLS becomes equal to the target differential pressure set by the spring 9.

Meanwhile, when the maximum load pressure Pamax is increased to such an extent that the differential pressure deviation ΔΔP between the load sensing differential pressure ΔPLS and the target differential pressure set by the spring 9 exceeds below the dead zone of the regulating valve 8, the regulating valve 8 is shifted from the neutral position shown in FIG. 1 to a right-hand position on the drawing, whereupon the head side of the control actuator 7 is communicated with the reservoir 31. This moves the piston of the control actuator 7 leftwardly on FIG. 1. The displacement volume of the main pump 2 is thereby enlarged to increase the delivery rate of the main pump 2, so that the increased flow rate is supplied to the actuators such as the hydraulic cylinder 3 and the hydraulic motor 4. Simultaneously, the pump pressure Ps is also raised to increase the load sensing differential pressure ΔPLS, resulting in that the differential pressure deviation ΔΔP approaches 0. When the differential pressure deviation ΔΔP approaches 0, the regulating valve 8 is shifted rightwardly on the drawing from the state establishing the aforesaid right-hand position. Therefore, the regulating valve 8 is finally controlled into a neutral condition where the load sensing differential pressure ΔPLS becomes equal to the target differential pressure set by the spring 9.

Then, in the case where the load sensing differential pressure ΔPLS is changed on account of external load, inertial load, fluid or oil compressibility, the differential pressure deviation ΔΔP between the load sensing differential pressure ΔPLS and the target differential pressure set by the spring 9 is within the dead zone of the regulating valve 8, causing the particular stroke region 8*c* to cut off both the communication of the head side with the rod side of the control actuator 7 and the communication of the head and rod sides of the control actuator 7 with the reservoir 31. Accordingly, if the hydraulic fluid is now supplied from the main pump 2 to the actuators such as the hydraulic cylinder 3 and the hydraulic motor 4 at a constant flow rate, the control actuator 7 remains rest to maintain an operating condition at that time. The displacement volume of the main pump 2 is also thereby maintained in the condition at that time to keep the pump delivery rate, i.e., the flow rate of the hydraulic fluid supplied to the actuators such as the hydraulic cylinder 3 and the hydraulic motor 4, in the same condition.

With this first embodiment, as described above, the dead zone, i.e., the stroke region 8*c*, is provided for the regulating valve 8, and the stroke region 8*c* is so set as to be larger than an amount of movement of the regulating valve 8 upon changes in the load sensing differential pressure ΔPLS on account of predictable factors such as external load, inertial load and fluid or oil compressibility. Therefore, even if the load sensing differential pressure ΔPLS is changed due to the external load or the like during the operation where the hydraulic fluid is supplied to the hydraulic cylinder 3 and/or the hydraulic motor 4 at a constant flow rate, the control actuator 7 remains rest to maintain the present condition; that is, the displacement volume of the main pump 2 is not changed. Accordingly, the pump delivery rate is not varied and the flow rate of the hydraulic fluid supplied to the actuators such as the hydraulic cylinder 3 and the hydraulic motor 4 is kept constant. As a result, the operating speed of the actuators is not changed, making it possible to ensure superior operability in spite of the occurrence of external load or the like.

Second Embodiment

A second embodiment of the present invention will be explained below with reference to FIGS. 2–5. In this embodiment, the pump regulator is constituted in electronic fashion.

Figure 2:
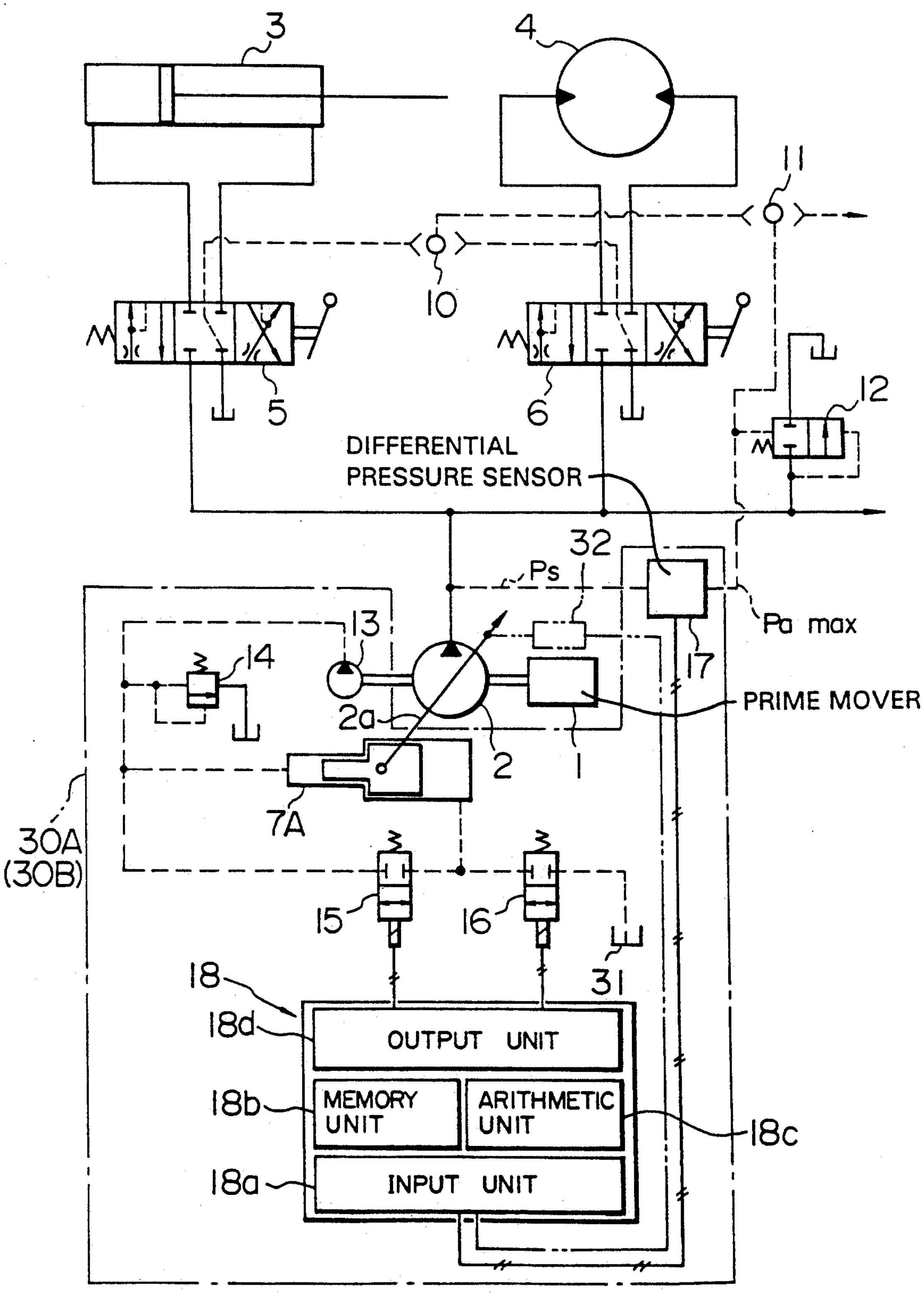
FIG. 2 is a diagrammatic view of a hydraulic drive system according to a second embodiment of the present invention.

Referring to FIG. 2, a hydraulic drive system of this embodiment comprises a prime mover 1, a main hydraulic pump 2, a hydraulic cylinder 3, a hydraulic motor 4, flow control valves 5, 6, shuttle valves 10, 11, and an unloading valve 12 as with the first embodiment explained above.

A pump regulator 30A of this embodiment comprises a control actuator 7A for driving a swash plate 2*a* of the main pump 2 to control the displacement volume, a pilot pump 13 communicated with the rod side of the control actuator 7A, a pilot relief valve 14 for holding a delivery pressure of the pilot pump 13 constant, a solenoid valve 15 disposed in a line communicating between the rod and head sides of the control actuator 7A, and a solenoid valve 16 disposed in a line communicating between the head side of the control actuator 7A and a reservoir 31, the latter line being also communicated with the solenoid valve 15. The pump regulator 30A further comprises a differential pressure sensor 17 for detecting a differential pressure between a pump pressure Ps and a maximum load pressure Pamax among actuators, i.e., a load sensing differential pressure ΔPLS, and outputting it as an electric signal, and a controller 18 for executing arithmetic and other processing in response to the signal from the differential pressure sensor 17 to output signals for driving the solenoid valves 15, 16.

The controller 18 comprises an input unit 18*a* for receiving the signal outputted from the differential pressure sensor 17, a memory unit 18*b* for storing a target differential pressure ΔPo desired in consideration of the circuit configuration, an arithmetic unit 18*c* for calculating a deviation ΔΔP between the load sensing differential pressure ΔPLS outputted from the differential pressure sensor 17 and the target differential pressure ΔPo, and an output unit 18*d* for outputting to the solenoid valves 15, 16 drive signals dependent on the deviation ΔΔP calculated by the arithmetic unit 18*c*.

Figure 3:
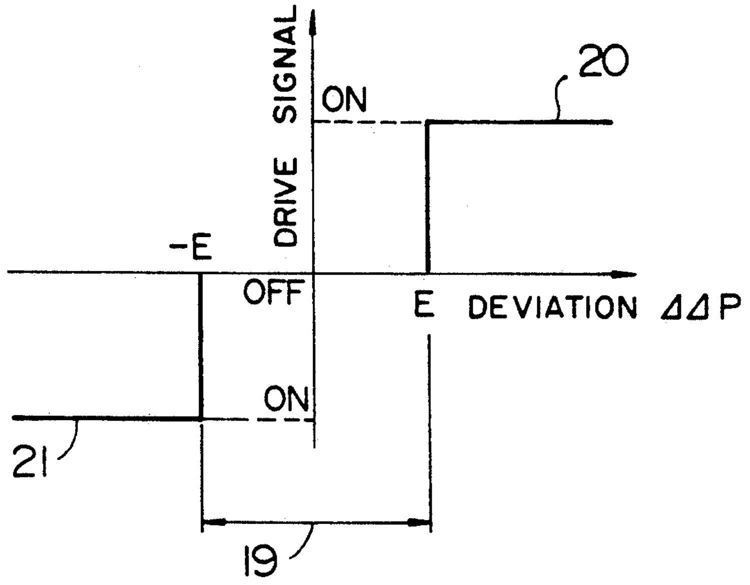
FIG. 3 is a graph showing a drive signal outputted from a controller employed in the second embodiment.

Further, the memory unit 18*b* of the controller 18 stores a dead zone 19 given by a region between a limit value −E on the negative side and a limit value E on the positive side as shown in FIG. 3, which region is so set as to make the pump delivery rate not changed despite of fluctuations in the load sensing differential pressure ΔPLS due to usually possible factors such as external load, inertial load and fluid or oil compressibility. The arithmetic unit 18*c* determines whether or not the deviation ΔΔP between the load sensing differential pressure ΔPLS and the target differential pressure ΔPo is within the dead zone 19 of FIG. 3. The output unit 18*d* outputs a drive signal to hold both the solenoid valves 15 and 16 in their OFF state, when the deviation ΔΔP is determined by the arithmetic unit 16 to be within the dead zone 19. In short, the controller 18 includes flow rate holding means for reserving a control to be effected by the pump regulator 30A when the deviation ΔΔP between the load sensing differential pressure ΔPLS and the target differential pressure ΔPo is within the dead zone 19 shown in FIG. 3, thereby holding the delivery rate of the main pump 2 substantially constant.

The second embodiment thus constituted operates as follows.

Figure 4:
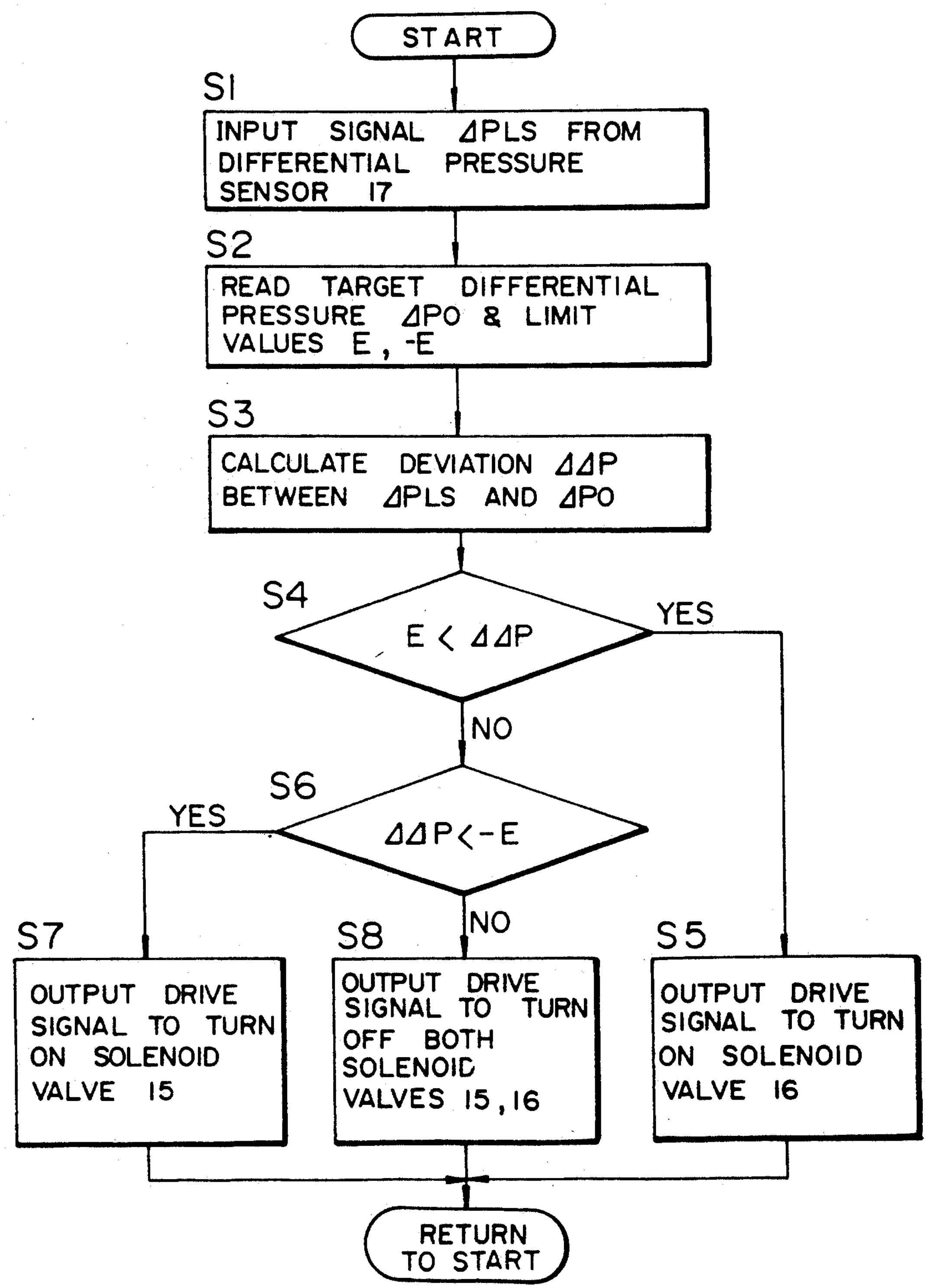
FIG. 4 is a flowchart showing the processing sequence for a pump regulator in the second embodiment.

The controller 18 executes a sequence of processing steps in accordance with a flowchart illustrated in FIG. 4. As shown at a step S1 in FIG. 4, the signal from the differential pressure sensor 17, i.e., the load sensing differential pressure ΔPLS given by the differential pressure between the pump pressure Ps and the maximum load pressure Pamax among the actuators, is first inputted to the arithmetic unit 18*c* through the input unit 18*a*. Then, as shown at a step S2, the target differential pressure ΔPo desired in consideration of the circuit configuration and the limit values E, −E defining the dead zone 19 shown in FIG. 3, both of which are stored in the memory unit 18*b*, are read into the arithmetic unit 18*c*. Afterward, the control flow proceeds to a step S3 where the arithmetic unit 18*c* performs calculation, i.e.;

$$\Delta PLS - \Delta Po = \Delta\Delta P \quad (1)$$

to obtain the deviation ΔΔP between the load sensing differential pressure ΔPLS and the target differential pressure ΔPo. The control flow then proceeds to a step S4 where the arithmetic unit 18*c* determines whether or not the deviation ΔΔP obtained from the above Equation (1) is larger than the limit value E.

If the determination in the step S4 is responded by YES, i.e., if the deviation ΔΔP is larger than the limit value E, this means that the deviation ΔΔP is so quite large that the delivery rate of the main pump 2 must be varied and, therefore, the control flow proceeds to a step S5. In the step S5, the output unit 18*d* outputs a drive signal to make the deviation ΔΔP zero (0), i.e., a drive signal indicated by a characteristic line 20 in FIG. 3, to the solenoid valve 16. The head side of the control actuator 7A shown in FIG. 2 is thereby communicated with the tank 31. Because a pilot pressure of the pilot pump 13 is supplied to the rod side of the control actuator 7A, a piston rod of the control actuator 7A is moved rightwardly to control the displacement of the main pump 2 to be decreased. Accordingly, the delivery rate of the main pump 2 becomes a relatively small value and the hydraulic fluid is supplied at this small flow rate to the actuators such as the hydraulic cylinder 3 and hydraulic motor 4, so that the deviation ΔΔP becomes 0, i.e., so that the load sensing differential pressure ΔPLS becomes equal to the target differential pressure ΔPo.

If the determination in the step S4 is responded by NO, the control flow proceeds to a step S6. In the step S6, the arithmetic unit 18*c* determines whether or not the deviation ΔΔP is smaller than the limit value −E. If this determination is responded by YES, i.e., if the deviation ΔΔP is smaller than the limit value −E, this means that the deviation ΔΔP is so quite small that the delivery rate of the main pump 2 must be varied and, therefore, the control flow proceeds to a step S7. In the step S7, the output unit 18*d* outputs a drive signal to make the deviation ΔΔP zero (0), i.e., a drive signal indicated by a characteristic line 21 in FIG. 3, to the solenoid valve 15. The rod and head sides of the control actuator 7A shown in FIG. 2 are thereby communicated with each other, whereupon the piston rod of the control actuator 7A is moved leftwardly on FIG. 2 due to the difference in the pressure receiving area between the rod and head sides of the control actuator 7A for controlling the displacement of the main pump 2 to be increased. Accordingly, the delivery rate of the main pump 2 becomes a relatively large value and the hydraulic fluid is supplied at this large flow rate to the actuators such as the hydraulic cylinder 3 and hydraulic motor 4, so that the deviation ΔΔP becomes 0, i.e., so that the load sensing differential pressure ΔPLS becomes equal to the target differential pressure ΔPo.

If the determination in the step S6 of FIG. 4 is responded by NO, this means the case that the deviation ΔΔP is so small as to require no change in the delivery rate of the main pump 2, i.e., that the deviation ΔΔP is within the dead zone 19 shown in FIG. 3 and, therefore, the control flow proceeds to a step S8. In the step S8, the output unit 18*d* outputs a drive signal to hold the control actuator 7A shown in FIG. 2 remained rest in the present condition, i.e., a drive signal to turn off both the solenoid valves 15 and 16. The solenoid valves 15 and 16 are each kept in a closed state shown in FIG. 2, and the control actuator 7A maintains a condition so far established. As a result, the displacement volume of the main pump 2 is not changed to hold the delivery rate of the main pump at the same value.

In the second embodiment thus arranged, assuming that the opening area of the flow control valve 5 is y and a flow rate factor (a constant including the density, acceleration of gravity and the like) is Cp, a flow rate Q1 of the hydraulic fluid passing through the flow control valve 5 is expressed by:

$$Q1 = Cp \cdot y\sqrt{Ps - Pamax} = Cp \cdot y\sqrt{\Delta PLS} \quad (2)$$

when a single actuator, e.g., the hydraulic cylinder 3, is solely driven. In this case, assuming the delivery rate of the main pump 2 to be Qp, Qp is equal to the flow rate Q1 of the hydraulic fluid passing through the flow control valve 5. Thus:

$$Qp = Cp \cdot y\sqrt{\Delta PLS} \quad (3)$$

Figure 5:
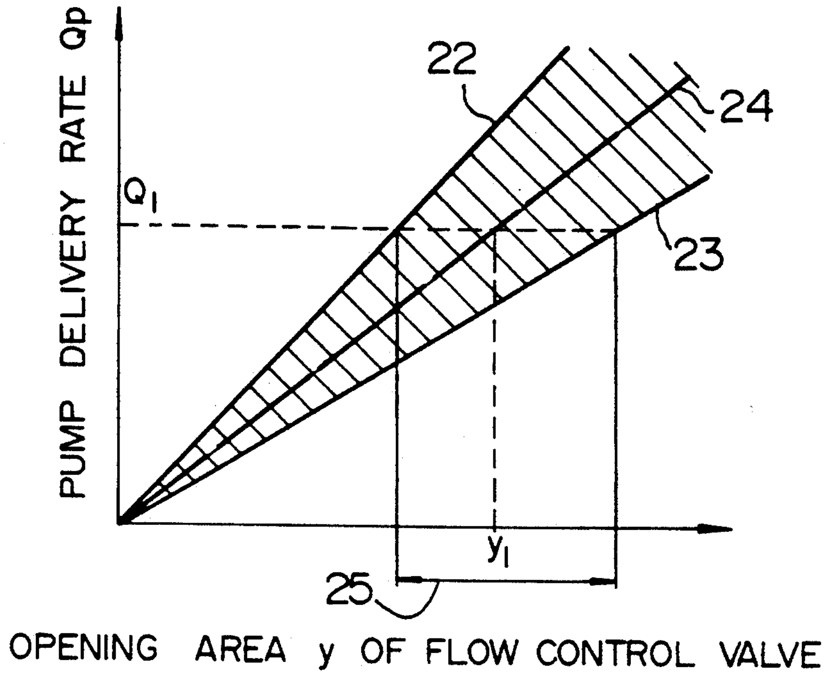
FIG. 5 is a graph showing characteristic lines obtained in the second embodiment.

Accordingly, the relationship between the opening area y of the flow control valve and the pump delivery rate Qp as established when the deviation ΔΔP is equal to the limit value E is given below from the Equation (3), taking into account ΔPLS=ΔPo+E;

$$Qp = Cp \cdot y\sqrt{\Delta Po + E} \quad (4)$$

and indicated by a characteristic line 22 in FIG. 5. The relationship between the opening area y of the flow control valve and the pump flow rate Qp as established when the deviation ΔΔP is equal to the limit value −E is given below, taking into account ΔPLS=ΔPo−E;

$$Qp = Cp \cdot y\sqrt{\Delta Po - E} \quad (5)$$

and indicated by a characteristic line 23 in FIG. 5.

Note that in the conventional load sensing system in which the load sensing differential pressure ΔPLS is controlled to be exactly coincident with the target differential pressure ΔPo, the relationship between the opening area y of the flow control valve and the pump delivery rate Qp is indicated by a characteristic line 24 in FIG. 5 as will be seen from the Equation (3).

In the conventional system, therefore, when the opening area y of the flow control valve is y1, the pump delivery rate Qp is uniquely given by Q1 on the characteristic line 24, and when y is changed up or down from y1, the pump delivery rate Qp is also varied correspondingly, as indicated in FIG. 5. On the contrary, in this second embodiment, assuming that the pump delivery rate Qp is Q1 when the opening area y of the flow control valve is y1, a dead zone 25 for the opening area y1 of the flow control valve, which is expressed below;

$$Q1/Qp\sqrt{\Delta Po + E} \leqq y \leqq Q1/Cp\sqrt{\Delta Po - E} \quad (6)$$

is provided with respect to the pump delivery rate Q1 as indicated in FIG. 5. Thus, the pump delivery rate Qp will not be changed even with the opening area y of the flow control valve varying to some extent.

Accordingly, with this second embodiment, even if the load sensing differential pressure ΔPLS is changed due to the external load or the like during the operation where the hydraulic fluid is supplied to the hydraulic cylinder 3 and/or the hydraulic motor 4 at a constant flow rate, the control actuator 7A remains rest to maintain the present condition similarly to the foregoing first embodiment. Thus, the displacement volume of the main pump 2 is not changed and so is the pump delivery rate Qp, for keeping the flow rate of the hydraulic fluid supplied to the actuators such as the hydraulic cylinder 3 and the hydraulic motor 4. As a result, the operating speed of the actuators is not changed, making it possible to ensure superior operability in spite of the occurrence of external load or the like.

Third Embodiment

A third embodiment of the present invention will be explained below with reference to FIGS. 2 and 6–9. In this embodiment, the dead zone is set variable dependent on the pump delivery rate.

The hardware configuration of a hydraulic drive system according to this embodiment is essentially the same as that of the second embodiment except that a pump regulator 30B further comprises a swash plate position sensor 32, indicated by imaginary lines in FIG. 2, for detecting a tilting position q of the swash plate 2a of the main hydraulic pump 2 and outputting it as an electric signal, and this signal is inputted to the controller 18.

Figure 6:
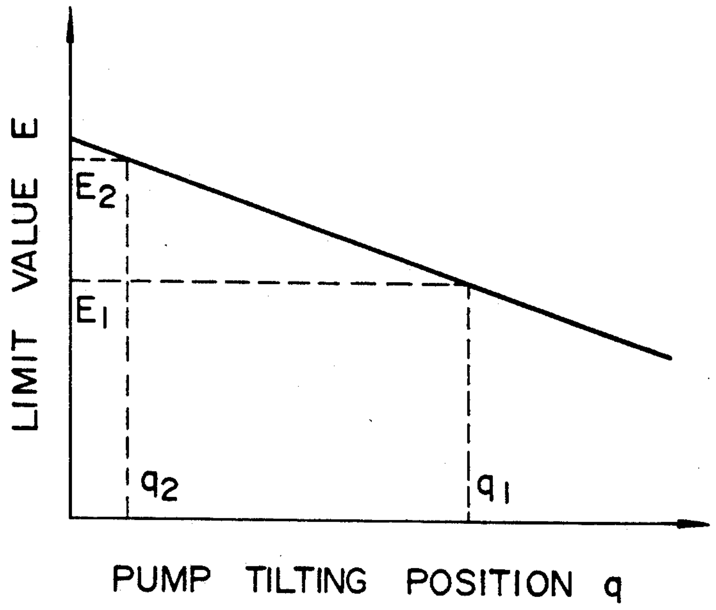
FIG. 6 is a graph showing the relationship between a pump tilting position and a limit value of a dead zone, stored in a controller employed in the third embodiment.

Further, the controller 18 stores in the memory unit 18b, as a function of the tilting position q of the swash plate 2a of the main pump 2 as shown in FIG. 6, a limit value E defining a dead zone, which is so set as to make the pump delivery rate not changed despite of fluctuations in the load sensing differential pressure ΔPLS due to usually possible factors such as external load, inertial load and fluid or oil compressibility. In FIG. 6, the relationship between the limit value E and the pump tilting position q is set such that as the pump tilting position q decreases, the limit value E is increased. The remaining function of the controller 18 is essentially the same as that in the second embodiment. Specifically, in this embodiment, the controller 18 also includes a flow rate holding means for reserving a control to be effected by the pump regulator 30B when the deviation ΔΔP between the load sensing differential pressure ΔPLS and the target differential pressure ΔPo is within the dead zone defined by the limit values E, −E, thereby holding the delivery rate of the main pump 2 substantially constant. In addition, the size of the dead zone is changed dependent on the pump tilting position q.

Figure 7:
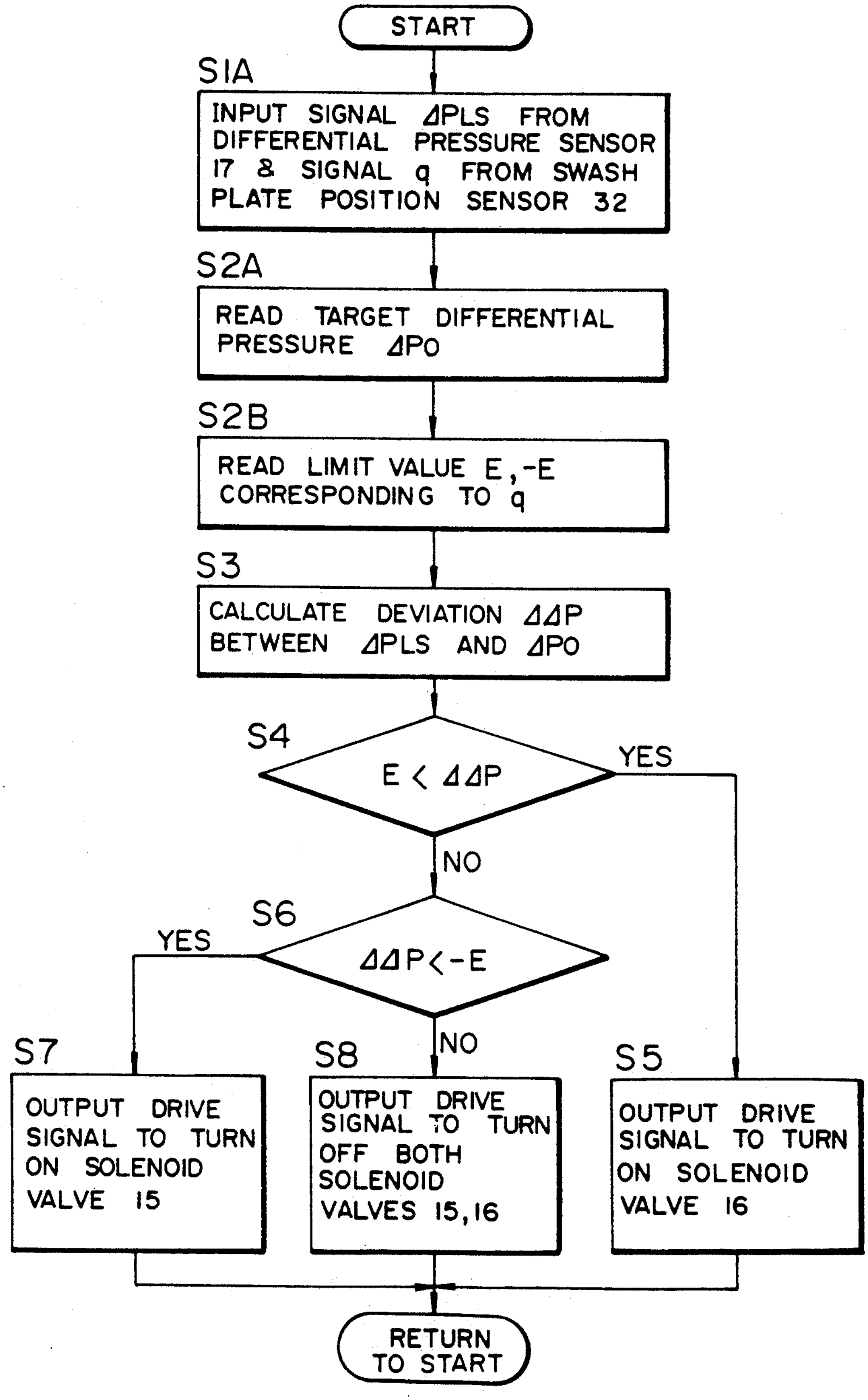
FIG. 7 is a flowchart showing the processing sequence for a pump regulator in the third embodiment.

The controller 18 executes a sequence of processing steps in accordance with a flowchart illustrated in FIG. 7. More specifically, in a step S1A, both the signal from the differential pressure sensor 17, i.e., the load sensing differential pressure ΔPLS between the pump pressure Ps and the maximum load pressure Pamax, and the signal from the swash plate position sensor 32, i.e., the swash plate tilting position q of the main pump 2, are first inputted to the arithmetic unit 18c through the input unit 18a. Then, in a step S2A, the target differential pressure ΔPo desired in consideration of the circuit configuration, which is stored in the memory unit 18b, is read into the arithmetic unit 18c. Afterward, in a step S2B, from the relationship shown in FIG. 6 and stored in the memory unit 18b, the limit value E corresponding to the pump tilting position q inputted in the step S1A is read to provide the limit values E, −E for defining the dead zone.

Thereafter, the control flow proceeds to steps S4-S8 to execute the subsequent processing in a like manner to the above second embodiment. Specifically, if the deviation ΔΔP between the load sensing differential pressure ΔPLS and the target differential pressure ΔPo is larger than the limit value E, the displacement of the main pump 2 is controlled to decrease (steps S4, S5). If the differential pressure deviation ΔΔP is smaller than the limit value −E, the displacement of the main pump 2 is controlled to increase (steps S4, S6, S7). In either case, the displacement of the main pump 2 is controlled so that the load sensing differential pressure ΔPLS becomes equal to the target differential pressure ΔPo. If the differential pressure deviation ΔΔP is within the dead zone defined by the limit values E and −E, the displacement of the main pump 2 is not changed (steps S4, S6, S8) to hold the delivery rate of the main pump 2 at the same value.

The reason why the limit value E of the dead zone is set variable dependent on the pump tilting angle in this embodiment thus arranged is as follows.

Figure 8:
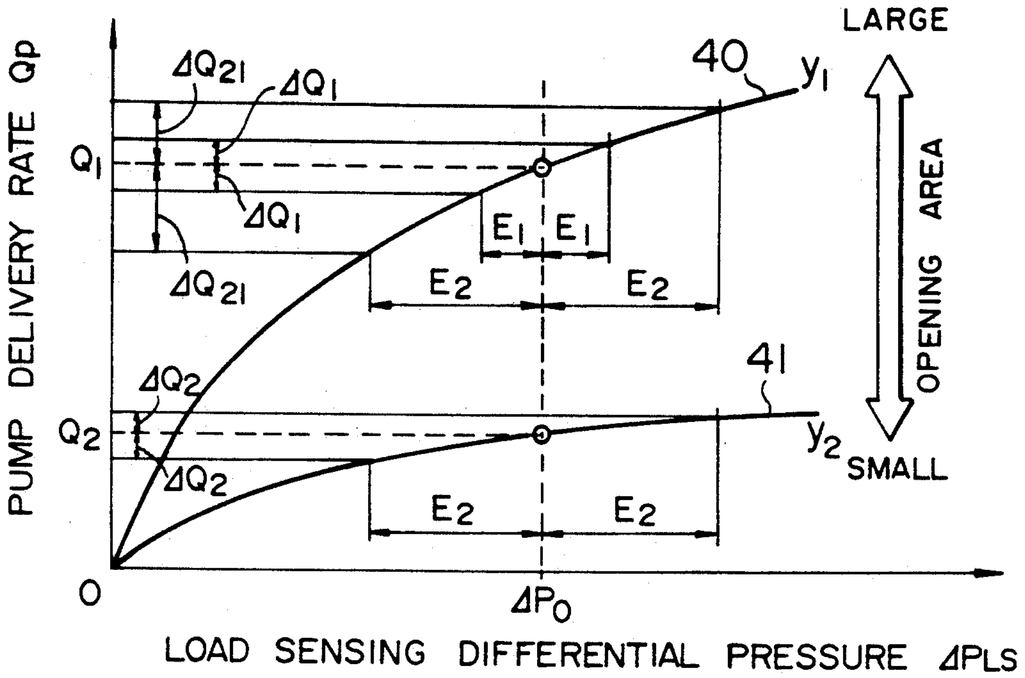
FIG. 8 is a graph showing the relationship among the opening area of a flow control valve, a dead zone for the load sensing differential pressure and a dead zone for the flow rate.

With the load sensing system employed in this embodiment, because the pump delivery rate Qp is expressed by the above Equation (3);

$$Qp = Cp \cdot y\sqrt{\Delta PLS}$$

the relationship between the pump delivery rate Qp and the load sensing differential pressure ΔPLS with the opening area y of the flow control valve being a parameter is given as shown in FIG. 8. In FIG. 8, a characteristic line 40 represents the case where the opening area y of the flow control valve is relatively large at y1, and a characteristic line 41 represents the case where it is relatively small at y2. As the opening area y decreases, a change rate of the flow rate Qp with respect to load sensing differential pressure ΔPLS is reduced. Accordingly, if the limit value E of the dead zone for the deviation between the load sensing differential pressure ΔPLS and the target differential pressure ΔPo were set fixed, a region of the pump delivery rate Qp corresponding to the fixed E, i.e., a flow rate dead zone ΔQ, would become larger with an increase in the opening area y.

More specifically, with the same fixed dead zone E2 set in FIG. 8, a flow rate dead zone ΔQ21 obtained from the characteristic line 40 when the opening area is y1 would be larger than a flow rate dead zone ΔQ2 obtained from the characteristic line 41 when the opening area is y2. On the other hand, in order to obtain a flow rate dead zone ΔQ1 substantially equal to the flow rate dead zone ΔQ2 from the characteristic line 40 when the opening area is y1, a required dead zone relating to the load sensing differential pressure ΔPLS is given by E1 smaller than E2.

The foregoing will be also understood from that when the differential pressure deviation is within the limit values ±E of the dead zone, the pump delivery rate Qp is expressed by:

$$Qp = Cp \cdot y\sqrt{\Delta Po \pm E} \quad (7)$$

and with the limit value E supposed to be constantly fixed in this Equation (7), the pump delivery rate Qp becomes smaller as the opening area y decreases.

Here, the flow rate dead zone ΔQ represents a region where the pump delivery rate Qp is not controlled despite changes in the load sensing differential pressure ΔPLS. If this region is too large, this means that controllability of the pump delivery flow rate is deteriorated, so are not only working performance, but also a capability of fine operation. Meanwhile, when the opening area y is small like y2, the circuit is strongly restricted by the flow control valve. In the respect of changes in the pump delivery pressure, this is equivalent to the case that the pump delivery rate flows into the narrow or small volume of a line upstream the flow control valve, causing the load sensing differential pressure ΔPLS to be varied at a larger rate with respect to a certain change in the flow rate. Therefore, if the dead zone E is too small, the dead zone could not develop the required effect for changes in the load sensing differential pressure ΔPLS, making control of the pump delivery rate unstable.

To put it in short, setting the dead zone E fixed irrespective of the opening area y raises the problem as follows. If the dead zone E is set to the size, e.g., E2, which provides suitable control when the opening area is y2, the flow rate dead zone ΔQ as given when the opening area is y1 would become too large, resulting in that controllability of the pump delivery flow rate would be deteriorated, so be not only working performance, but also a capability of fine operation. On the other hand, if the dead zone E is set to the size, e.g., E1, which provides suitable control when the opening area is y1, control of the pump delivery rate would be unstable at the small opening area.

In this embodiment, as explained above, the limit value E defining the dead zone is set variable dependent on the pump tilting position q. In the load sensing system, as explained above, too, since the load sensing differential pressure ΔPLS is controlled to coincide with the target differential pressure ΔPo and the relationship between the opening area y of the flow control valve and the pump delivery rate Qp is expressed by the Equation (2), the opening area y and the pump flow rate Qp are in substantially proportional relation as indicated by the characteristic line 24 of FIG. 5. Assuming that a revolution speed of the prime mover 1 driving the main pump 2 is substantially constant, the pump delivery rate Qp and the swash plate tilting position q of the main pump 2 are also in substantially proportional relation. Accordingly, by setting the relationship between the pump tilting position q and the limit value E such that the limit value E is increased as the pump tilting position q decreases, as shown in FIG. 6, the larger dead zone E2 is provided from a corresponding pump tilting position q2 when the opening area of the flow control valve is small like y2, and the smaller dead zone E1 is provided from a corresponding pump tilting position q1 when the opening area of the flow control valve is large like y1.

Figure 9:
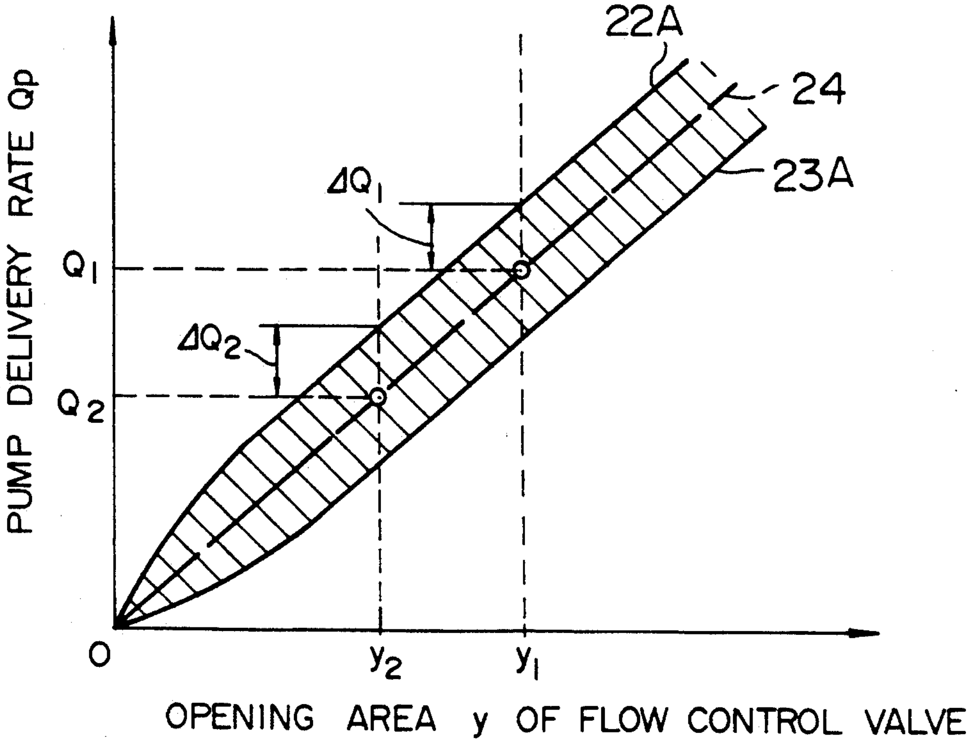
FIG. 9 is a graph showing characteristic lines obtained in the second embodiment.

FIG. 9 shows the relationship between the opening area y of the flow control valve and the pump delivery rate Qp, corresponding to that shown in FIG. 5, in the case of varying the dead zone E as mentioned above. In FIG. 9, characteristic lines 22A, 23A correspond to the characteristic lines 22, 23 in FIG. 5, respectively. As will be seen from FIG. 9, where the size of the dead zone E is varied in an above-described manner, the flow rate dead zone is kept substantially constant all over the entire region of the opening area y, as indicated by ΔQ1, ΔQ2.

Accordingly, at the small flow rate with the small opening area y, the dead zone E is increased to perform stable control of the pump delivery rate and, at the large flow rate with the large opening area y, the dead zone E is decreased to keep the flow rate dead zone ΔQ substantially constant, thereby preventing deterioration of working performance and ensuring an excellent capability of fine operation.

With this embodiment, therefore, since the flow rate holding means is provided in the pump regulator 30B, it is possible to suppress changes in the pump delivery rate caused by external load, inertial load, fluid or oil compressibility and the like, and to ensure good operability. Further, since the dead zone is varied in its size dependent on the pump tilting angle, superior working performance and an excellent capability of fine operation can be ensure nearly all over the range of the pump delivery rate without affecting stability of the pump control.

Although the above third embodiment is arranged to detect the swash plate position of the main pump 2 and vary the limit value E of the dead zone dependent on the detected swash plate position, the equivalent advantageous effect can be obtained even with the limit value E of the dead zone set variable dependent on the pump delivery rate, as will be understood from the foregoing explanation. In this case, the pump delivery rate may be determined, for example, by deriving the displacement volume of the main pump 2 from the swash plate position and multiplying the resultant displacement volume by a revolution speed of the main pump 2. As an alternative, a stroke amount of the flow control valve may be detected to set the dead zone E variable dependent on the detected stroke amount.

While several preferred embodiments of the present invention have been described above, the present invention is not limited to those embodiments and can be modified in various manners. For instance, although the foregoing embodiments are arranged to produce no change in the delivery rate of the main hydraulic pump when the differential pressure deviation between the load sensing differential pressure and the preset target differential pressure is within the preset dead zone, the control system may be arranged to allow changes in the pump delivery rate to such an extent as will hardly affect operation of the actuators.

Moreover, in the present invention, the delivery rate of the main hydraulic pump is held substantially constant when the differential pressure deviation between the load sensing differential pressure and the preset target differential pressure is within the preset dead zone. But, since a slight amount of leak of the hydraulic fluid is usually inevitable in hydraulic equipment, this leak may causes the pump delivery rate to be changed minutely despite of an attempt of holding the pump delivery rate substantially constant under control. Therefore, such a minute change should be construed to be within the "substantially constant" range.

INDUSTRIAL APPLICABILITY

According to the present invention, it is possible to suppress changes in the pump delivery rate upon fluctuations in the load sensing differential pressure caused by external load, inertial load, fluid or oil compressibility and the like. As a result, there can be obtained the advantageous effect of preventing an operating speed of the actuator from changing on account of the external load and the like, and improving operability of the actuator as compared with the prior art.

What is claimed is:

1. A hydraulic drive system for a civil engineering and construction machine, comprising a main hydraulic pump of variable displacement type, a plurality of actuators driven by a hydraulic fluid delivered from said main hydraulic pump, a plurality of flow control valves for controlling flow of the hydraulic fluid supplied to said actuators, and pump control means for receiving a differential pressure between a delivery pressure of said main hydraulic pump and a maximum load pressure among said plurality of actuators, as a load sensing differential pressure, and controlling a delivery rate of said main hydraulic pump so that said load sensing differential pressure is held at a preset target differential pressure, said hydraulic drive system further comprising:

flow rate holding means having a dead zone for a deviation between said load sensing differential pressure and said target differential pressure for reserving a control to be effected by said pump control means when said deviation is within said dead zone, thereby to hold the delivery rate of said main hydraulic pump substantially constant; and said pump control means including a control actuator for driving displacement volume varying means of said main hydraulic pump, valve means for controlling operation of said control actuator, a differential pressure sensor for detecting said load sensing differential pressure, and a controller for calculating a differential pressure deviation between the load sensing differential pressure detected by said differential pressure sensor and said target differential pressure, and driving said valve means so that said differential pressure deviation is reduced, wherein said flow rate holding means is incorporated in said controller and includes means for storing limit values (E, −E) to define said dead zone and means for determining whether or not said differential pressure deviation is within said dead zone defined by said limit values, and outputting to said valve means a signal to hold said control actuator in a rest state when said differential pressure deviation is within said dead zone.

2. A hydraulic drive system for a civil engineering and construction machine according to claim 1, wherein said dead zone is a variable value that varies in accordance with the delivery rate of said main hydraulic pump.

3. A hydraulic drive system for a civil engineering and construction machine, comprising a main hydraulic pump of variable displacement type, a plurality of actuators driven by a hydraulic fluid delivered from said main hydraulic pump, a plurality of flow control valves for controlling flows of the hydraulic fluid supplied to said actuators, and pump control means for receiving a differential pressure between a delivery pressure of said main hydraulic pump and a maximum load pressure among said plurality of actuators, as a load sensing differential pressure, and controlling a delivery rate of said main hydraulic pump so that said load sensing differential pressure is held at a preset target differential pressure, said hydraulic drive system further comprising:

flow rate holding means having a dead zone for a deviation between said load sensing differential pressure and said target differential pressure for reserving a control to be effected by said pump control means when said deviation is within said dead zone, thereby to hold the delivery rate of said main hydraulic pump substantially constant; and said pump control means including a control actuator for driving displacement volume varying means of said main hydraulic pump valve means for controlling operation of said control actuator, a differential pressure sensor for detecting said load sensing differential pressure, and a controller for calculating a differential pressure deviation between the load sensing differential pressure detected by said differential pressure sensor and said target differential pressure, and driving said valve means so that said differential pressure deviation is reduced, wherein said flow rate holding means includes means for detecting the delivery rate of said main hydraulic pump, means incorporated in said controller for storing a relationship between the delivery rate of said main hydraulic pump and a limit value to define said dead zone as a variable dependent on the detected delivery rate of said main hydraulic pump, and means incorporated in said controller for deriving a limit value (E) of said dead zone corresponding to said detected pump delivery rate from said stored relationships, determining whether said differential pressure deviation is within said dead zone defined by said limit value, and outputting to said valve means a signal to hold said control actuator in a rest state when said differential pressure deviation is within said dead zone.

4. A hydraulic drive system for a civil engineering and construction machine according to claim 3, wherein said dead zone variable value decrease as the delivery rate of said main hydraulic pump is increased.

* * * * *